(12) United States Patent
Reddering et al.

(10) Patent No.: US 8,408,091 B2
(45) Date of Patent: Apr. 2, 2013

(54) SAFETY ROTARY OPERATOR ASSEMBLY

(75) Inventors: Maarten Willem Reddering, Oisterwijk (NL); Marcel P. Magermans, 's-Gravenhage (NL)

(73) Assignee: Ewac Holding BV, Rotterdam (NL)

( * ) Notice: Subject to any disclaimer, the term of this patent is extended or adjusted under 35 U.S.C. 154(b) by 715 days.

(21) Appl. No.: 12/471,936

(22) Filed: May 26, 2009

(65) Prior Publication Data

US 2010/0294632 A1 Nov. 25, 2010

(30) Foreign Application Priority Data

May 25, 2009 (EP) ..................................... 09161033

(51) Int. Cl.
*G05G 5/06* (2006.01)
(52) U.S. Cl. ......................................................... 74/527
(58) Field of Classification Search ................. 74/527, 74/553, 567, 569, 813 C; 200/11 R, 325, 200/329, 336
See application file for complete search history.

(56) References Cited

U.S. PATENT DOCUMENTS

| 2,231,598 | A | | 2/1941 | Shroyer | |
|---|---|---|---|---|---|
| 4,037,490 | A | | 7/1977 | Wilson | |
| 4,311,887 | A | | 1/1982 | Takagi et al. | |
| 7,214,894 | B1 | * | 5/2007 | Kakuno et al. | 200/6 A |
| 2006/0262234 | A1 | * | 11/2006 | Fukui et al. | 349/9 |

FOREIGN PATENT DOCUMENTS

DE 101 52 425 A1 5/2002

OTHER PUBLICATIONS

International Search Report for related European Application No. EP 09 16 1033, report dated Oct. 2, 2009.

* cited by examiner

*Primary Examiner* — Vicky Johnson
(74) *Attorney, Agent, or Firm* — Miller, Matthias & Hull LLP

(57) ABSTRACT

A rotary operator assembly (1A) includes a grip member (4), a spindle member (6A), and an operator body member (8). The spindle member (6A) is attached to the operator body member (8), being rotatable with respect to the operator body member (8) about an operative axis of rotation (A). The grip member (4) is movably coupled to the spindle member (6A) and the operator body member (8) and is translatable between a first translational position and a second translational position with respect to the operator body member (8). The grip member (4) and the operator body member (8) include cooperating means for blocking rotation of the grip member (4) with respect to the operator body member (8) about the operative axis of rotation in the first position and for allowing rotation of the grip member (4) with respect to the operator body member (8) about the operative axis of rotation in the second position from a first angular position to a second angular position. The grip member (4) is configured to operably couple with the spindle member (6A) in at least the second translational position, and the grip member (4) comprises at least one portion cooperating with at least one portion of the spindle member (6A) for preventing translation of the grip member (4) between the first translational position and the second translational position in the first angular position.

16 Claims, 13 Drawing Sheets

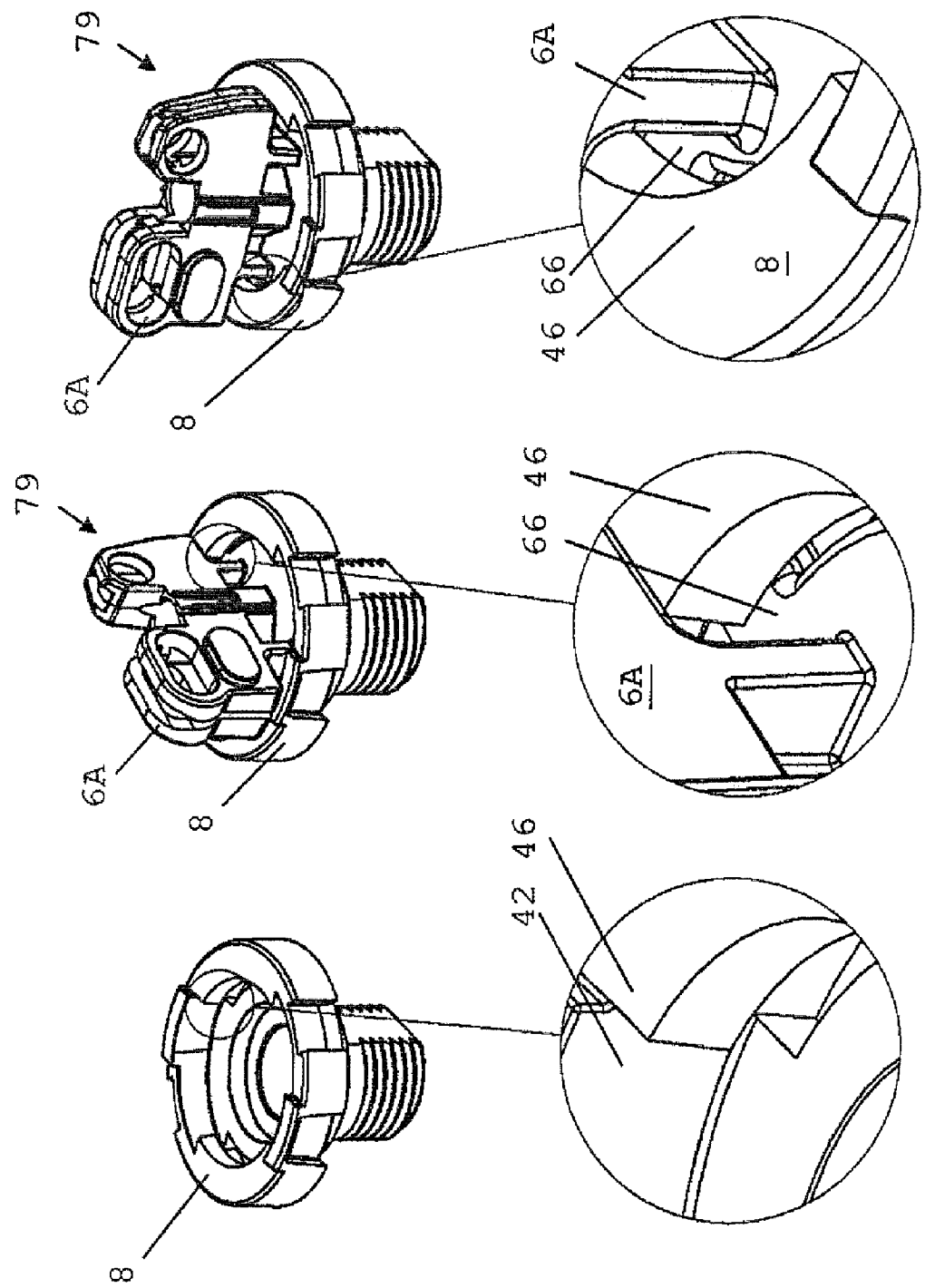

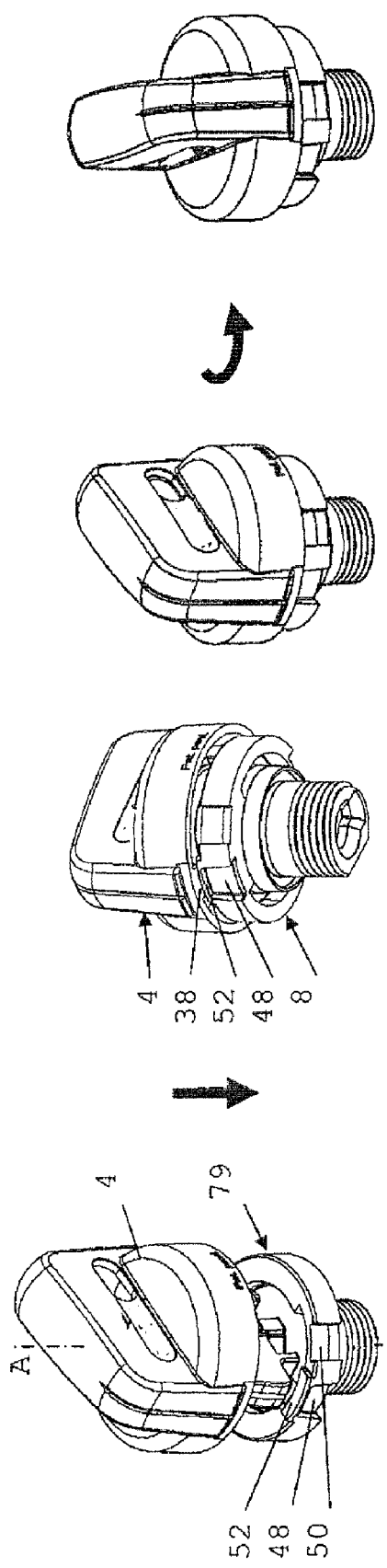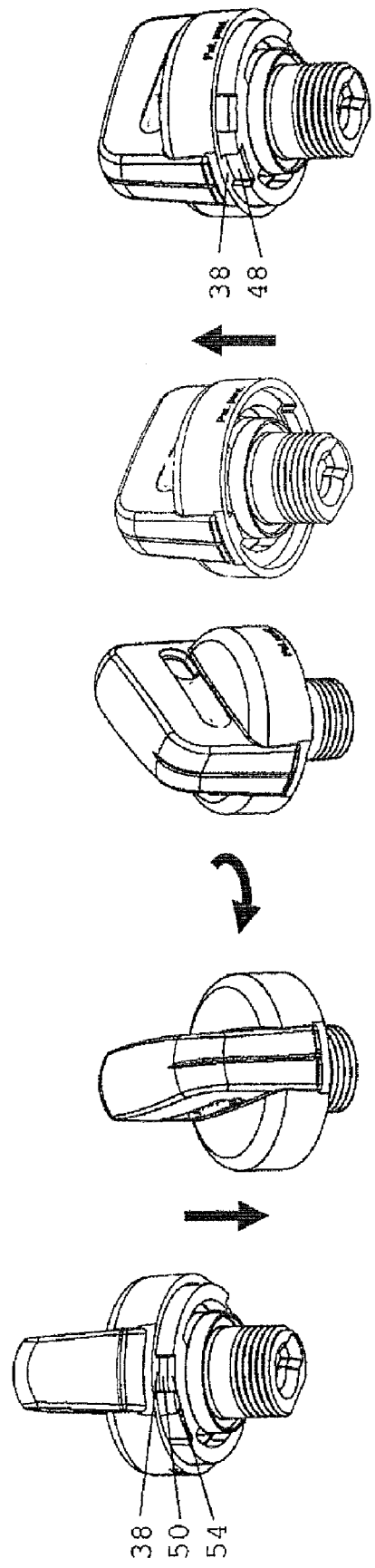

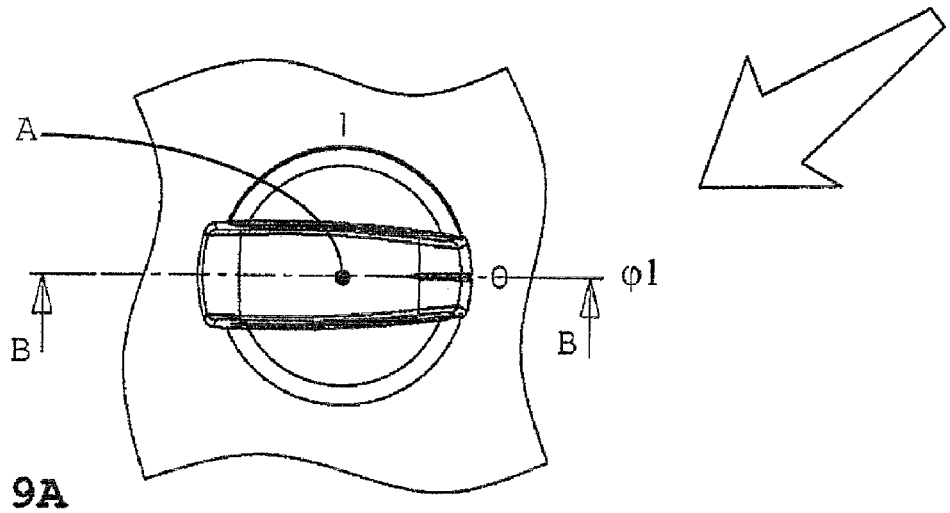
Fig. 9A
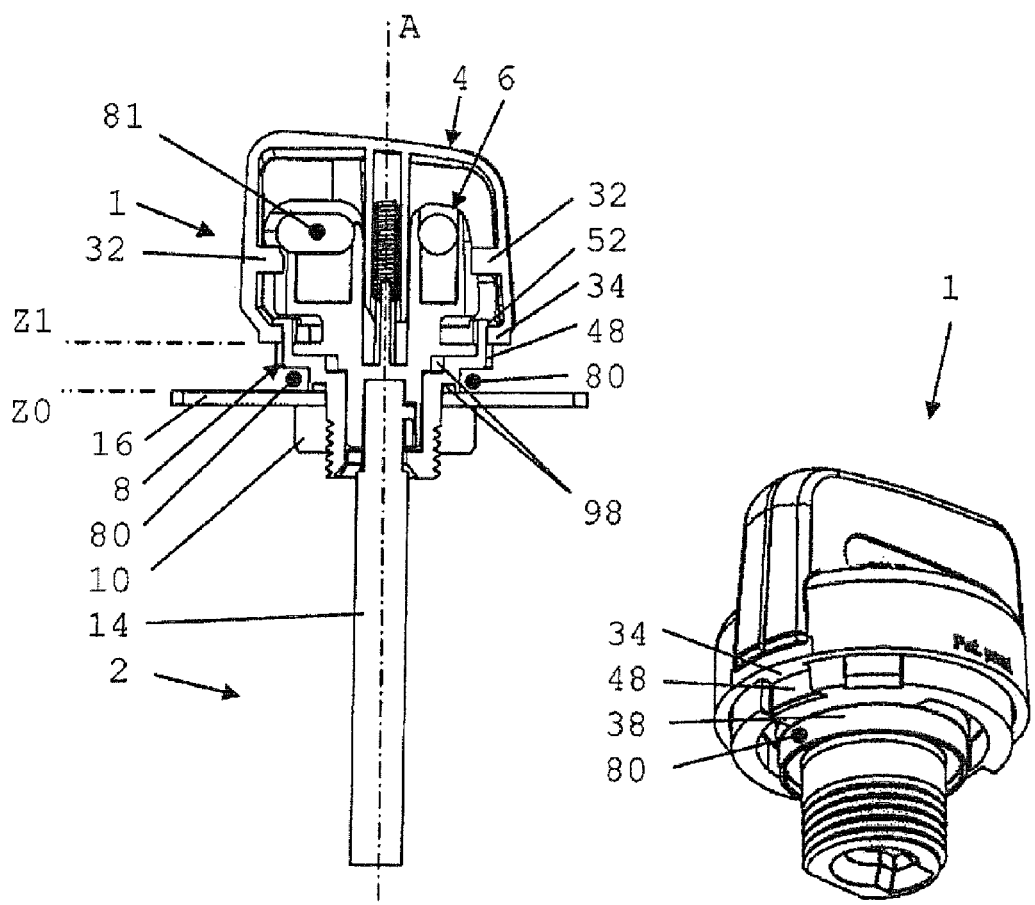
Fig. 9B
Fig. 9C

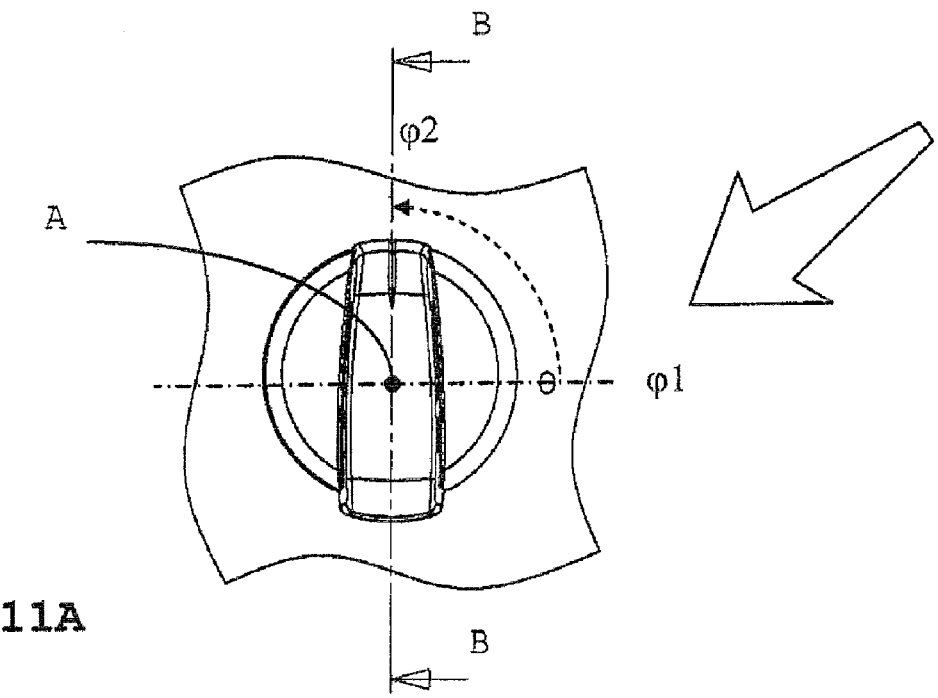
Fig. 11A
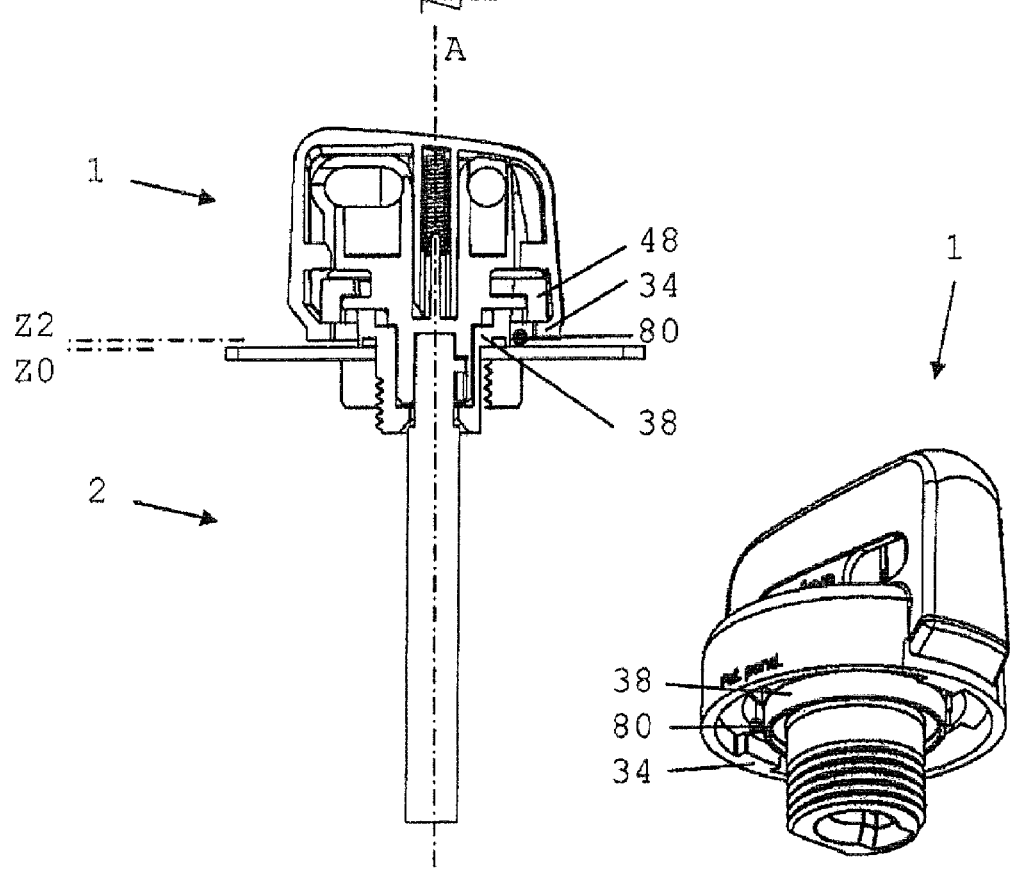
Fig. 11B
Fig. 11C

SAFETY ROTARY OPERATOR ASSEMBLY

FIELD OF THE DISCLOSURE

The present disclosure relates to the field of rotary operators, in particular rotary operators comprising safety features against unintended operation.

BACKGROUND OF THE DISCLOSURE

Rotary operable devices are well known, as are rotary operators for operating such devices are well known. Examples are rotary switches and valves comprising a manually operable rotary operator such as a handle grip, a knob or a lever. A particular class of rotary operators is formed by safety rotary operators in which the device may be blocked from unintended operation by locking the operator in a particular position (safe position) corresponding to a particular state of the device, e.g. an "off" state.

However, dangerous situations may arise in case the operator can be locked in a "safe" position whereas operational portions of the device are not in the corresponding desired state. For instance, in some rotary electrical switches having stationary electrical contacts and rotary electrical contacts mounted to a spindle, the contacts may have become welded together in an "on" state whereas the rotary operator may be turned and locked in a position corresponding to an off-state with torsion of the spindle. Thus, the switch may appear to be "off" whereas in fact the electrical circuit is still "on". Similar may happen for other types of rotary operable devices and for rotary valves wherein the actual position of an operated object, e.g. a switch or a valve body, may not correspond to the position of the object indicated by the position of the operator.

For example, U.S. Pat. No. 5,302,925 discloses a molded case circuit breaker rotary handle operator which allows the circuit breaker handle to be locked when the circuit breaker contacts are open. The handle is prevented from being locked in position when the circuit breaker contacts are welded in their closed condition since a padlock plate extending from the rotary handle is prevented from operation unless the circuit breaker contacts are open.

EP 0 450 699 discloses a locking device comprising within a handle for rotating control of electromechanical equipments a latch, for locking the handle in a preselected position, which can be engaged by a padlock only if the electromechanical equipment properly carries a desired movement out, making available in the latch a seat for the padlock only in the last case, the possibility of the latch of being engaged by the padlock depending either by movement clearance between the handle and rotating movement control devices thereto connected, or by movement clearance between a shaft integrally connected to the handle and a disk, provided with cam shape, controlling an enabling device.

DE 42 06 378 discloses an actuator for switch devices which has a rotating handle form-fitted to the switch shaft of the device in the rotary direction, and snap-fitted on to the shaft in the axial direction. The handle has a pivot lever. In the closed position, this blocks movements of the handle and also prevents pulling of the switch shaft. The lever has a nose which engages on a radial aperture in the shaft. Rotary movement is locked by a locking device or a recess in the housing wall. Closure or sealing devices can be inserted in apertures of the lever to protect against unauthorised operation.

Such devices comprise a significant number of parts, making them rather complex and costly to manufacture and they are correspondingly sensitive to damage and malfunction, e.g. by rough handling and/or soiling in outdoors field-operation.

Since safety is of the utmost importance and cost efficiency is always a concern, there is a desire for an improved rotary operator.

SUMMARY OF THE DISCLOSURE

In one aspect, a rotary operator assembly is provided comprising a grip member, a spindle member, and an operator body member. The spindle member is attached to the operator body member and is rotatable with respect to the operator body member about an operative axis of rotation. The grip member movably coupled to the spindle portion and the operator body member and is translatable between a first translational position and a second translational position with respect to the operator body member. The grip member and the operator body member comprise cooperating means for blocking rotation of the grip member with respect to the operator body member about the operative axis of rotation in the first translational position and for allowing rotation of the grip member with respect to the operator body member about the operative axis of rotation in the second translational position from a first angular position to a second angular position. The grip member is configured to operably couple with the spindle member in at least the second translational position. The grip member comprises at least one portion cooperating with at least one portion of the spindle member for locking translation of the grip member between the first translational position and the second translational position in the first angular position.

The operator body member may be a portion of a rotary operable device, e.g. a housing portion, or a separate part (to be) attached to a portion of a rotary operable device. The grip portion may be any suitable manually operable type, e.g. a handle, a turning knob, a hand wheel, and/or require additional tools such as a key, a wrench, a screw-driver, etc.

Rotation of the grip portion with respect to the operator body member is enabled in the first translational position and disabled in the second translational position. Requiring translation of the grip member between the first position and the second position provides a first degree of security against inadvertent rotation of the grip member. Operably (de-) coupling with the spindle member may comprise mechanically (dis-) engaging the spindle member prior (after) rotating the spindle member; suitable coupling means may comprise a fork-and-blade type coupling. The cooperating portions allow preventing the translation between the first and second position, therewith providing additional control over possible abuse of the assembly and thus over a device controlled by the assembly. Since translation of the grip member itself may be prevented or enabled, rotation of the grip member, and thus of the spindle member may be prevented or enabled without additional parts being required. This improves robustness and reliability. It also facilitates manufacturing.

The grip portion may substantially cover at least a portion of the spindle member and/or the operator body member, restricting access to possibly relatively delicate portions of the assembly and thus increasing safety of the assembly. Further, soiling or otherwise ingress of dust, debris etc. into the assembly may be prevented and operational reliability may be further improved.

In an embodiment, the first and second translational positions of the grip member with respect to the operator body member may be separated by a translation in a direction substantially parallel to and/or along the operative axis of rotation of the spindle member.

Thus the assembly may be operated with a convenient push-rotate or pull-rotate motion. By forcing a user to effect a two-step motion in different directions for operation, awareness of his/her action may be increased, increasing safety. Translation between the first and second positions along the axis of rotation allows reducing valuable surface area or operation volume required for operating the assembly, compared to translation in a substantially radial direction with respect to an operative axis of rotation.

In an embodiment, the grip member may comprise at least one first portion cooperating with at least a second portion of the spindle member for locking the grip member to the spindle member in the first translational position.

Such locking prevents translation from the first translational position to the second translational position and thus prevents rotation of the grip member, and therewith of the spindle member, with respect to the operator body member. Thus, inadvertent or unauthorised operation of the assembly may be prevented. In a device comprising the assembly, the first translational position may correspond to an "off"-status of the device or associated equipment, preventing accidental switching the device or equipment to an "on" status which may be dangerous. In a particular aspect, the cooperating portions may comprise through holes in the members which may register only in the first translational position so as to accommodate a bolt or a shackle of one or more personal padlocking devices of users, increasing personal security against unauthorised use.

In an embodiment, the grip member and the spindle member comprise cooperating blocking means for allowing translation of the grip member with respect to the operator body member between the first translational position and the second translational position in a first relative angular position of the spindle member and the grip member and for blocking displacement of the grip member between the first translational position and the second translational position in a second relative angular position of the spindle member and the grip member different from the first relative angular position.

Reaching or maintaining the first relative angular position, or not doing so, provides an indication that the angular positions of the grip member and the spindle member (do not) correspond to a particular predetermined precision. Such may be the case in an electrical switch comprising the operator assembly in which switch electrical contacts have become welded together when the grip member is in the second angular position; (forcibly) rotating the grip member will produce a torque between the grip member and a spindle member coupled with the switch workings such as the contacts, resulting in a deviation of the relative angular position of the grip member and the spindle member from the first relative angular position. Hence, the grip portion is prevented from being brought into the first translational position when the grip portion is rotated to the first angular position. Thus, erroneous indication of an "off" state when in fact an electrical contact is still present is prevented.

Efficiently, the cooperating blocking means comprise at least a receiving portion in at least one of the spindle member and the grip member which is configured to receive at least one projecting portion of at least one of the grip member and the spindle member, respectively.

The spindle member and the operator body member may be configured such that the spindle member is rotatably attachable or rotatably attached to the operator body member in a third angular position which is different from the first and second angular position.

Further, the grip member and the operator body member may be configured such that the grip member is attached or attachable to the operator body member in a fourth angular position which is different from the first and second angular position an which may be different from the third angular position in appropriate cases (the references "third" and "fourth" are for administrative purposes and do not imply presence or absence of the other angular position). The third and fourth angular positions may be outside an angular range defined between the first and second angular positions.

These options allow providing a substantially robust assembly in the first and second translational positions since no structural compromises for assembling the rotary operator assembly need be made at the first and second angular positions. In addition, when the rotary operator is already coupled to a device, safety may be assured during assembling since that occurs at a different angular position.

In an embodiment the grip member and the operator body member may be configured such that the grip member is attached or attachable to the operator body member to an intermediate attachment state in one angular position and to a substantially definitive attachment state in another angular position.

This allows increasing safety during assembling the assembly, since the grip member and the operator body member need not be configured for full assembly in one angular position and thus allow a stronger overall construction. Further, one or more of the angular positions concerned for assembling may correspond with the first or second angular positions of the grip member, which may ensure that the assembly is assembled in a desired state of a device, e.g. "off".

In an embodiment the grip member is attachable or attached to the operator body member by cooperating snap-lock means arranged in a rotationally asymmetric pattern with respect to the operative axis or rotation. Thus, a particular angular position for assembling the assembly may be defined, which may not affect or interfere with operating an assembled rotary operator assembly.

In an embodiment, the assembly may comprise means for urging the grip member to a default position, such as from the second translational position towards the first translational position. In an embodiment in which a relative angular position between the spindle member and the grip member is relevant, the assembly may comprise means for urging the grip member and the spindle member to a default relative position, such as a position of substantially zero relative angular position. Urging means acting on rotation and translation may be integrated or be one. Such measures improve operational security of a device comprising the assembly in the sense that the assembly assists attaining a default position, e.g. an "off" state.

A rotary operable device comprising a rotary operator assembly of the aforementioned type provides increased user safety.

A suitable rotary operable device is an electrical switch comprising at least a first and a second electrical contact and at least one further electrical contact, the further contact being at least one or coupled or couplable with the spindle member and being configured to establish electrical contact between the first and second electrical contacts in at least one predetermined angular position of the spindle member. Advantageously, electrical contact is established in the second angular position and is broken in the first angular position, irrespective of the grip member being in the first or second translational position.

Conveniently, various members of the rotary operable assembly may be provided as a kit of parts for assembling the rotary operable assembly at a desired time and location.

BRIEF DESCRIPTION OF THE DRAWINGS

The above-described aspects and others will be explained in more detail hereafter with reference to the schematic figures, in which like elements carry like numerals and in which:

FIGS. 7A-7C and FIGS. 8A-8I show a method of assembling a rotary operator assembly;

FIGS. 9A-9C are various views of a rotary operator assembly in a first state;

FIGS. 11A-11C are various views of a rotary operator assembly in a third state;

DETAILED DESCRIPTION OF THE DISCLOSURE

Figure 1A:
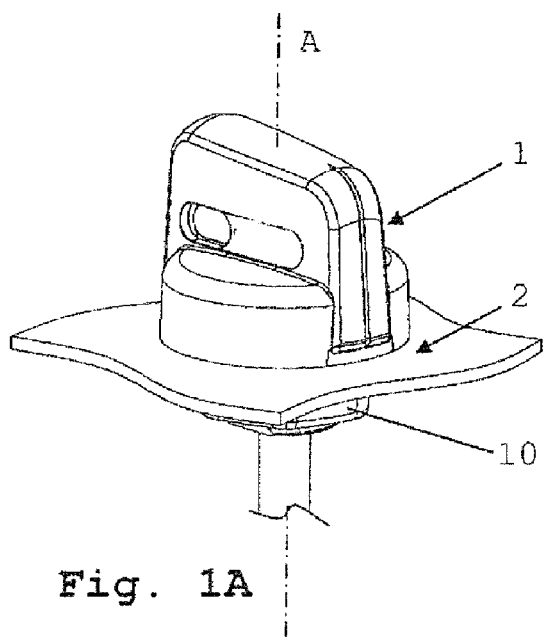
FIG. 1A-1B are different views of a first embodiment of a rotary operator assembly.
Figure 1B:
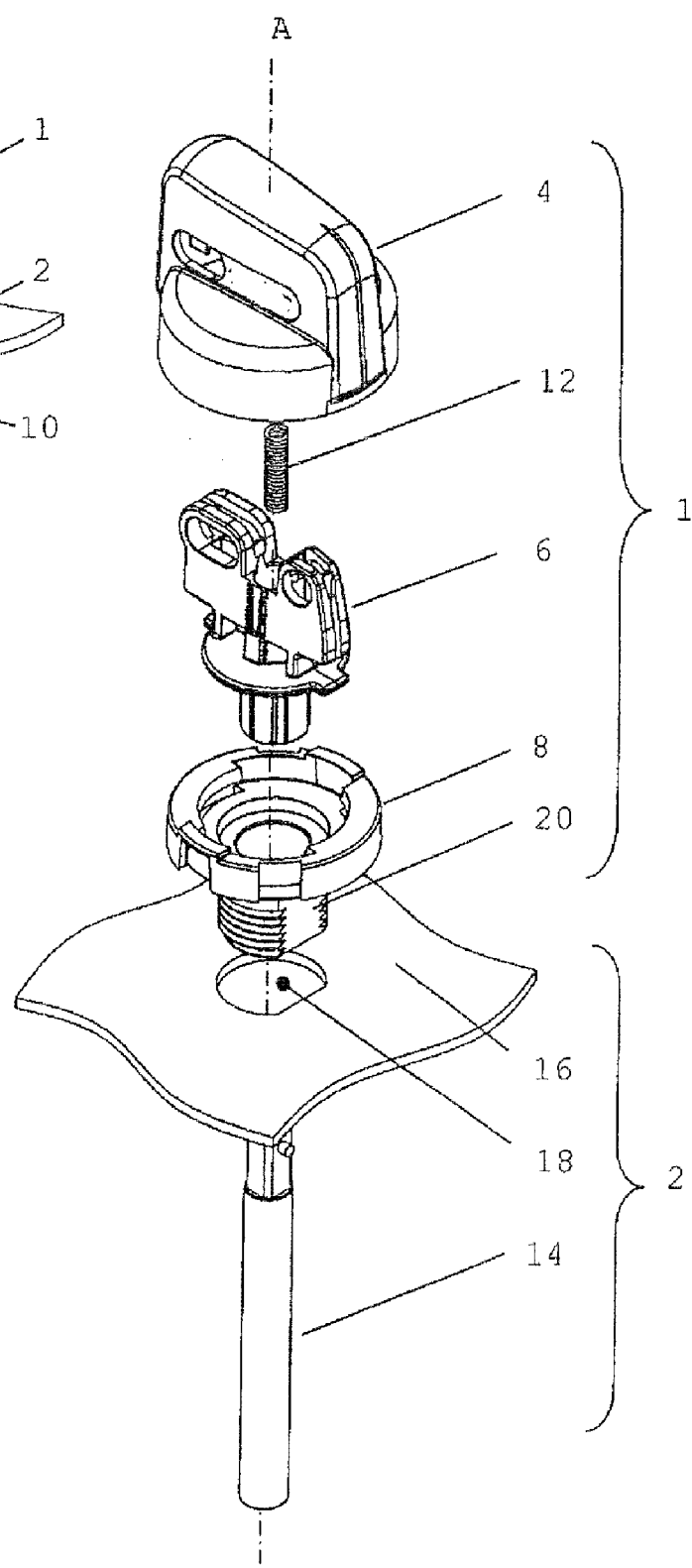

FIGS. 1A and 1B show a rotary operator assembly 1 and a fragment of a switch 2 in an assembled configuration (FIG. 1A) and in an explosion view (FIG. 1B). The rotary operator assembly 1 (or "assembly 1" for short) comprises a grip member 4, a spindle member 6, an operator body member 8 and a mounting nut 10. A compression spring 12 is arranged between the grip member 4 and the spindle member 6.

The grip member 4 is configured to receive and substantially cover the spring 12, a portion of the spindle member 6 and a portion of the operator body member 8 in the assembled configuration (FIG. 1A) providing a generally closed assembly 1.

The switch 2 comprises a rotary spindle 14 and a housing 16.

The spindle 14 is rotatable with respect to the housing 16 about an axis of rotation A. The grip member 4 and the spindle member 6 are generally rotatable with respect to the operator body member 8 about the axis of rotation A (see below).

The operator body member 8 is configured to be fixed to the switch 2 in a non-rotary fashion. Here, the housing 16 is provided with a non-rotationally symmetric hole 18 and the operator body member is correspondingly provided with a non-rotationally symmetric mounting portion 20.

Figure 2:
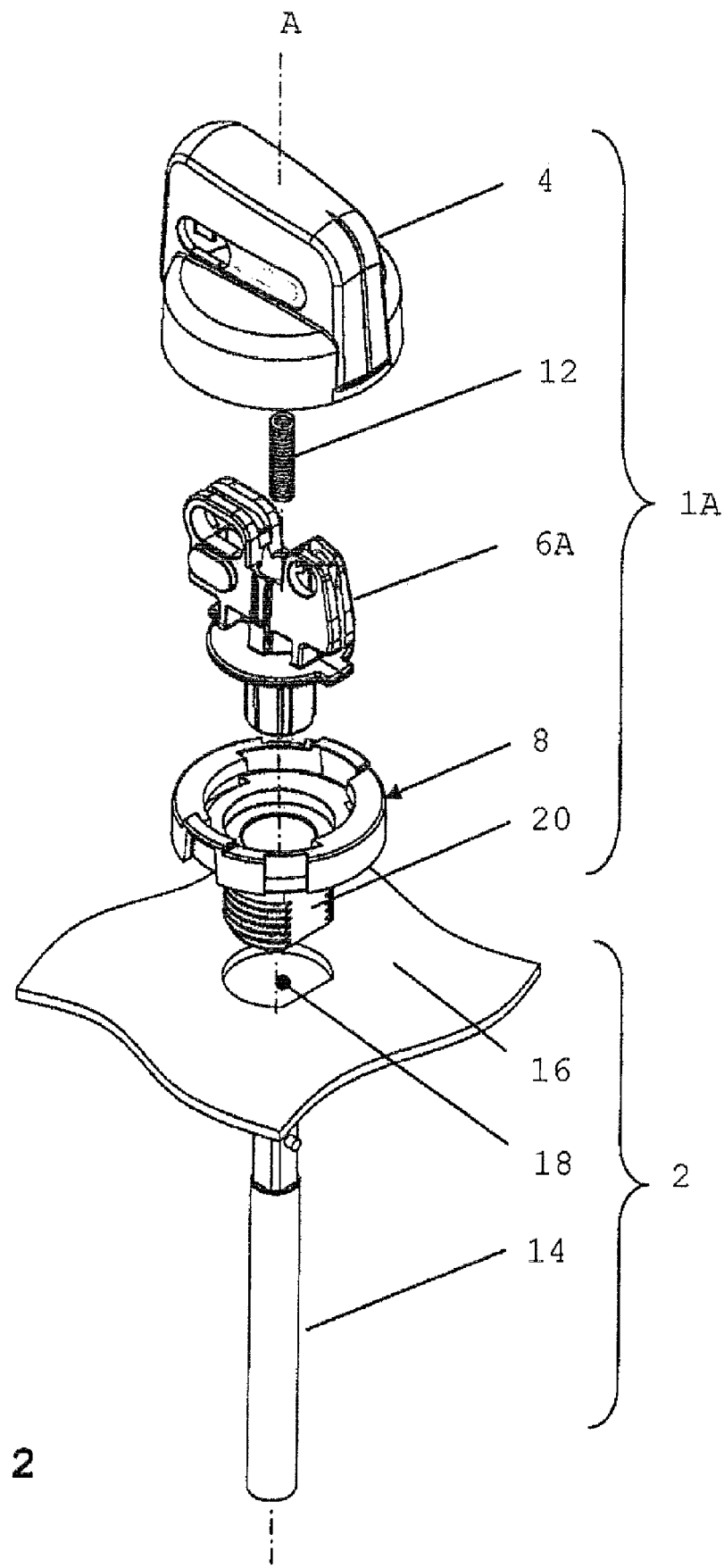
FIG. 2 is an explosion view of a second embodiment of a rotary operator assembly.

FIG. 2 shows a rotary operator assembly 1A and a switch 2. The assembly 1A is substantially identical to the assembly 1, except for comprising a different spindle member 6A (see below).

Figure 3A:
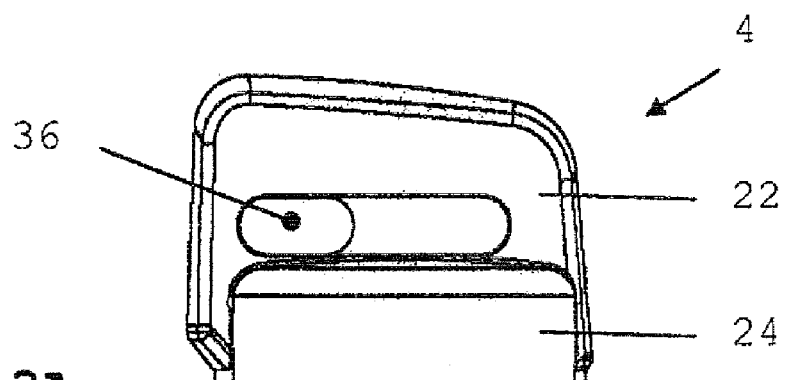
FIGS. 3A-3C show a grip member.
Figure 3B:
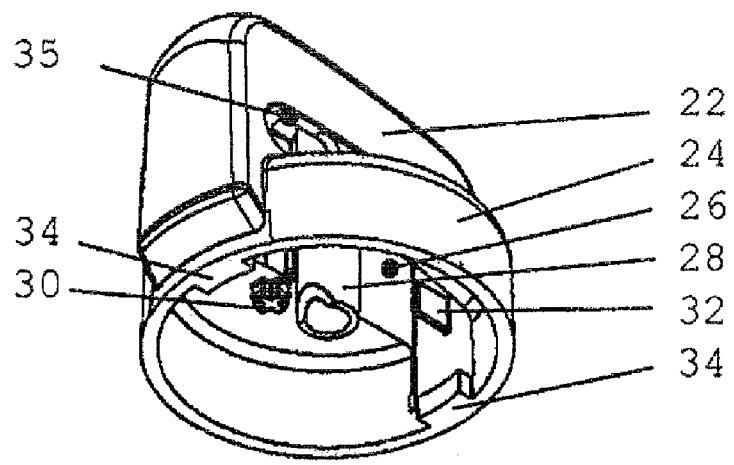
Figure 3C:
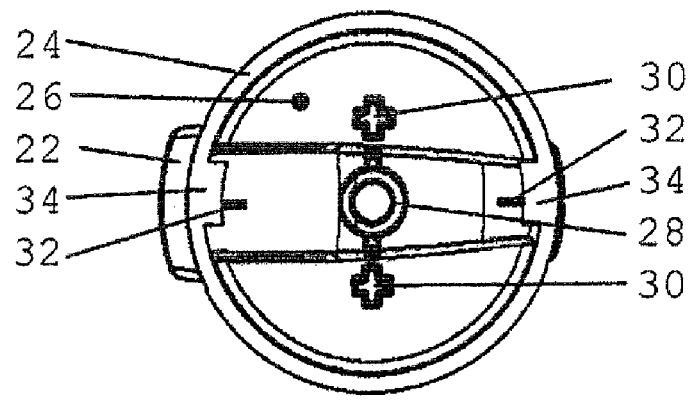

Referring to FIGS. 3A-3C, the grip member 4 is formed as a rotary knob having a grip portion or rib 22 and a skirt portion 24. The grip member 4 is substantially hollow, providing a cavity 26, best seen in bottom perspective view FIG. 3B and bottom view 3C. Inside the cavity 26 a tubular portion 28 and pegs 30 extend substantially parallel to along the axis A. The tubular portion 28 is adapted to accommodate the spring 12. Resilient portions 32, which are optional, and cams 34 extend substantially radially inward from the skirt portion 24 with respect to the axis A. The cams 34 are offset from an axis of symmetry of the grip member 4 to such extent that the grip member 4 has no rotational symmetry. In the rib 22 windows 35 are provided so as to provide a through hole 36 through the grip member rib 22.

Figure 4A:
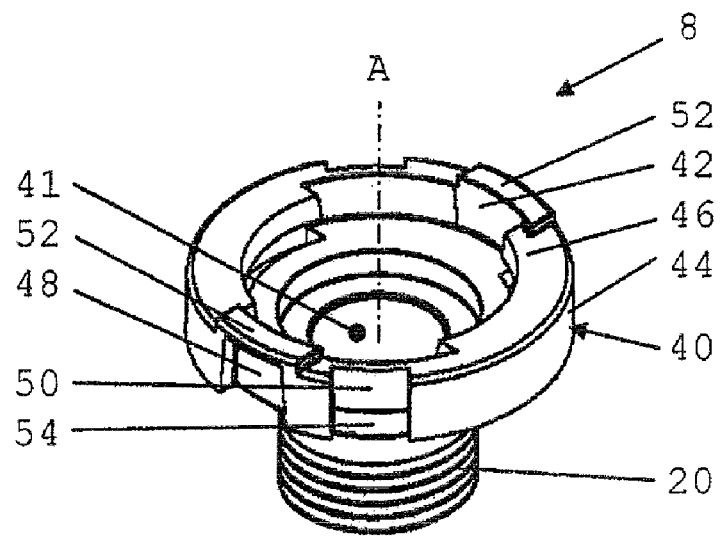
FIGS. 4A-4C show an operator body member.
Figure 4B:
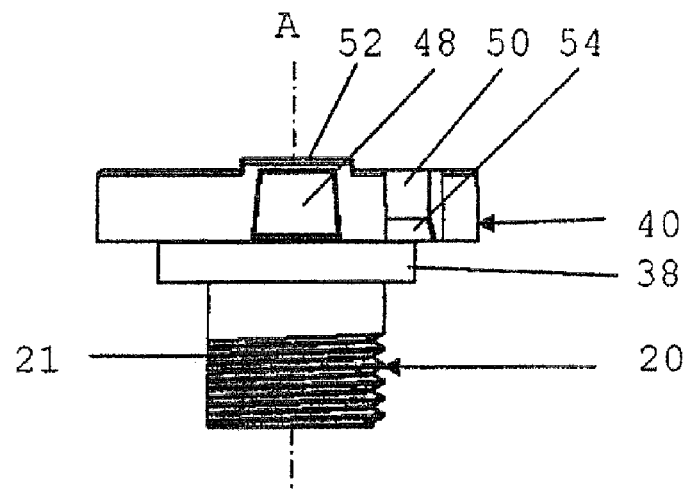
Figure 4C:
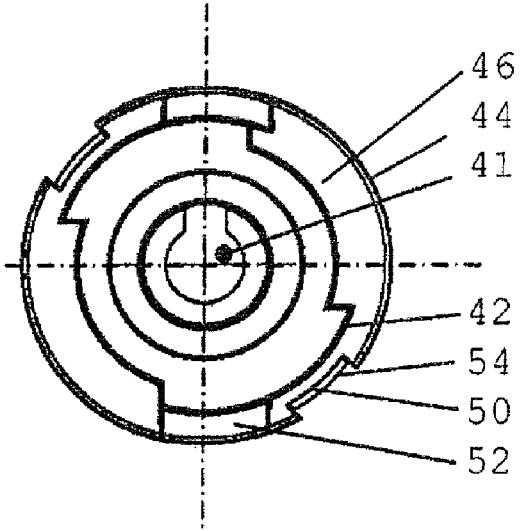

FIG. 4A shows the operator body member 8 in perspective and FIG. 4B is a side view and FIG. 4C is a top view. The operator body member 8 comprises a first portion or mounting portion 20, a second portion 38 and a third portion or ring portion 40. The three portions 20, 38, 40 are arranged along the direction of the axis A. A bore 41 for receiving a portion of the spindle member 6, 6A and/or the spindle 14 extends through the operator body member 8.

The mounting portion 20 in the shown embodiment comprises a screw thread and is provided with means for preventing rotation with respect to an object to which it is mounted, here a flat face 21 (see e.g. FIGS. 1B and 2).

The second portion 38 has a generally round outer circumference with a diameter between that of the first portion 20 and the third portion 40.

The third portion 40 is generally annular and comprises an inner wall 42 and an outer wall 44. On the inner wall 42, cams 46 protrude substantially radially inward. In the outer wall 44 first grooves 48 and second grooves 50 are provided which extend substantially parallel to the axis A. First grooves 48 are open towards the second portion 38 and are closed at the opposite end with stops 52. Second grooves 50 are closed towards the second portion 38 with latches 54.

The first and second grooves 48, 50 are arranged for receiving the cams 34 of the grip member 4 and are correspondingly slightly offset from an axis of symmetry of the operator body member 8 breaking rotational symmetry.

Figure 5A:
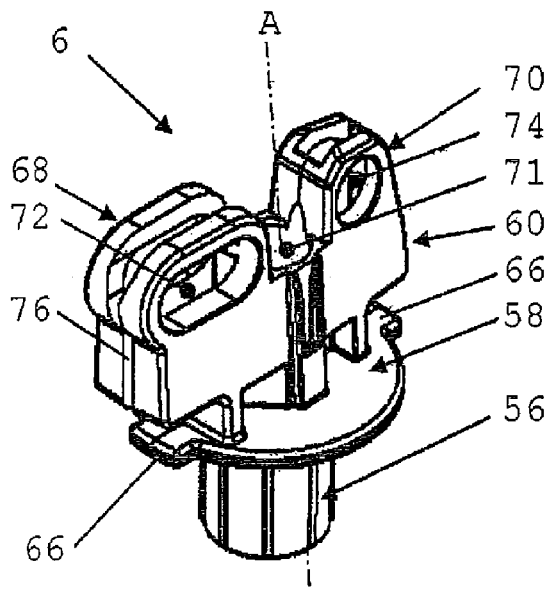
FIGS. 5A-5B and 6A-6B show a spindle member of the first and second embodiments, respectively.
Figure 5B:
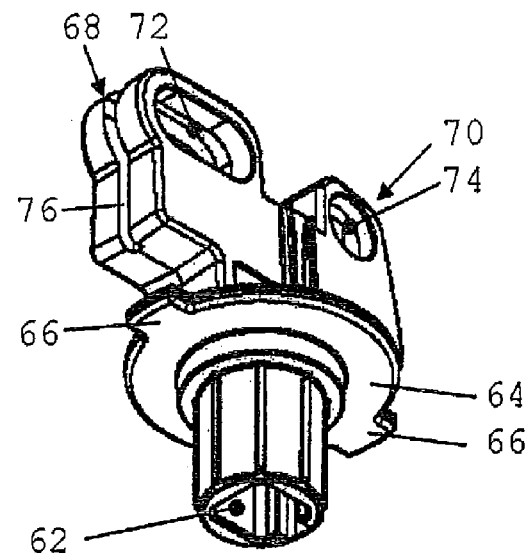
Figure 6A:
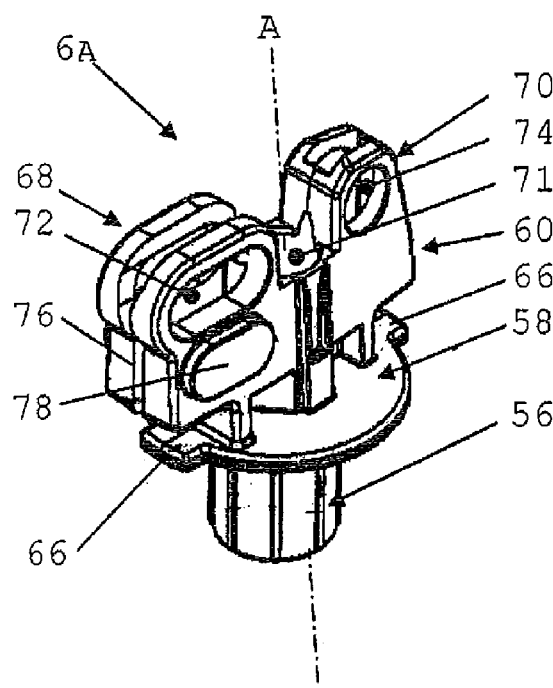
Figure 6B:
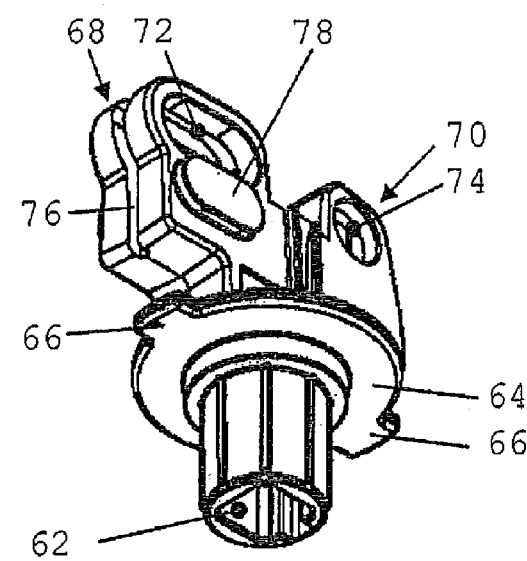

FIGS. 5A and 5B show the spindle member 6 of assembly 1 and FIGS. 6A-6B show the spindle member 6A of assembly 1A.

The spindle members 6, 6A somewhat resemble a wing-nut and comprise a first portion 56 for coupling with a portion of a spindle 14, a second portion 58 for coupling with an operator body member 8 and a third portion 60 for coupling with a grip member 4. The first, second and third portions 56, 58, 60 are arranged to extend substantially along the axis A.

In the shown spindle members 6, 6A the first portion 56 has a generally round outer shape and it is configured for receiving a portion of a spindle 14 in a non-rotatable fashion, here by providing a recess 62 for fitting a spindle 14 having a substantially square cross-section with a key-portion extending from one of the square side faces. The spindle member 6, 6A may comprise other arrangements for operably coupling to a portion of a device.

The second portion 58 comprises a generally discoid portion 64 extending substantially perpendicular/radial about the axis A and two cams 66 extending substantially radial outward with respect to the axis of rotation A. The cams 66 are offset from an axis of symmetry to such extent that the spindle member 6 has no rotational symmetry.

The third portion 60 has substantially flat wing-like portions 68 and 70 extending substantially perpendicular to the discoid portion 64 and substantially parallel to a plane comprising the axis A. In between the wing-like portions 68 and 70 a recess 71 is provided for receiving the compression spring 12 and the tubular portion 28 of the grip member 4. The wing-like portion 68 and 70 comprise through holes 72 and 74, respectively, which extend substantially perpendicular to the wing-like portions 68, 70. The wing-like portions 68, 70 each comprise a groove 76 extending substantially radial and parallel relative to the axis A. The grooves 76 are configured for receiving the resilient portions 32 of the grip member 4.

A difference between the spindle member 6 of FIGS. 1, 5A-5B and spindle member 6A of FIGS. 2, 6A-6B is the provision of cams 78 on the third portion 60 of the spindle member 6A, which cams 78 extend substantially perpendicular to the wing-like portion 68. A function of these cams 78 is explained below.

FIGS. 7A-7C, show attachment of the spindle member 6A (identical for spindle member 6) to the operator body member 8, providing a sub-assembly 79. The figures show both an overview in perspective and a detail indicated in the overview. The attachment is performed by bringing the spindle member 6A and the operator body member 8 in a relative angular position such that (the cams 66 of) the spindle member 6A fit into the cavity 41 of the operator body member 8. Next, the spindle member 6A is rotated thereby to lock the cams 66 behind the cams 46. Thus, rotation of the spindle member 6A with respect to the operator body member 8 about the axis A is enabled but a relative translation of the members 6A, 8 parallel to the axis A is substantially prevented.

In the shown embodiments, the translational locking engagement extends for substantially a quarter turn (angle of rotation of about 90°) compare FIGS. 7B, 7C. With a different non-rotational symmetric arrangement of the cams 46 and the cams 66 translational locking may extend over a larger angle of rotation, e.g. about a half turn (about 180°). The relative angular position for attaching the members 6, 8 together advantageously is different, preferably outside from an angle of operation of a device comprising the assembly 1, such that detachment of the spindle member 6 from the locking member 8 during operation may be prevented.

FIGS. 8A-8I show attaching the grip member 4 to the sub-assembly 79 of FIGS. 7B-7C. Initially, the spindle member and the operator body member are arranged in a first angular position about the axis of rotation A. In case the sub-assembly 79 is comprised in a rotary operable device, this first angular position may correspond to a safe or "off" status of the device. Then, the grip member 4 is arranged over the spindle member 6A (or 6) and the spring 12, so that these are fitted within a portion of the cavity 26 of the grip member 4 within the rib 22, until the cams 34 of the grip members contact the stops 52 of the operator body member (FIGS. 8A-8C) and (the rib 22 of) the grip member 4 and (the third portion 60 of) the spindle member 6A are operably coupled for rotation about the axis of rotation A. The optional resilient portions 32 of the grip member 4 may fit into the grooves 76.

Next, the grip member 4 is rotated about the axis of rotation A with respect to the operator body member 8 so as to bring the cams 34 of the grip member 4 into alignment with the second grooves 50 of the operator body member 8 (FIGS. 8B-8D). By this rotation the spindle member 6A is rotated as well with respect to the operator body member 8. If a spindle 14 is coupled to the spindle member 6A it will be rotated as well. The angular arrangement of the second grooves 50 of the operator body member 8 therefore preferably does not correspond to an angular position for operating the switch 2.

Next, the grip member 4 is translated (here: pushed) along the axis A so that the cams 34 and snap behind the latches 54 (FIGS. 8D-8F) to lock the grip member 4 to the operator body member 8.

Then, the grip member 4 may be rotated back to the first angular position with respect to the axis A until the cams 34 of the grip member 4 are brought into alignment with the first grooves 48 of the operator body member 8 (FIGS. 8G, 8H) and the grip member is translated along the axis A, e.g. by the spring force of the spring 12 until the cams 38 are located in the second grooves 48 and contact the stops 52 (FIG. 8I).

Basic operation of the assembly 1 is explained with respect to FIGS. 9A-11C. Particular operation of the assembly 1A of FIG. 2 is further explained with respect to FIGS. 12A-13B. These Figs. show different states in the operation. Operation of the assembly by a user involves performing a translate-rotate motion (first-push-then-turn motion) between three distinct states; a first state or initial state (FIGS. 9A-9C), a second state or intermediate state (FIGS. 10A-10C), and a third state or final state (FIGS. 11A-11C). With assembly 1A a fourth state (FIGS. 12A-12D) may occur. In each set of FIGS. 9A-12C, Sub-fig. A is a top view of the assembly 1 and the switch 2, Sub-fig. B is a cross sectional view along the line indicated in sub-fig A and sub-fig C is a perspective view of the assembly 1, 1A in a direction along the arrow in the top right corner of the Fig, only showing the assembly 1, 1A and leaving out portions of the switch 2.

FIGS. 9A-9C show a first state of the assembly 1 and the switch 2.

In the cross-sectional view of FIG. 9B is visible that a groove or volume 80 is defined between (the second portions 38 and the third portion 40 of) the operator body member 8 and the switch housing 16. The volume 80 extends at least partially radially inward with respect to the axis A from the outer wall 44 of the third portion 40 of the operator body member 8 along at least a portion of the outer wall 44 of the third portion 40. However, a volume 80 may be defined by a substantially radial groove extending in a substantially angular (tangential) direction about the axis A in the third portion 40. Further, sealing rings 98 are provided to making a substantially dust and/or liquid-tight connection between the assembly 1 and the housing 16.

In this first state, the grip member 4 is arranged in a first angular position or rotational position φ1 and in a first translational position Z1 with respect to the axis A and a surface of the second portion 38 of the operator body member 8, corresponding to the surface of the switch 2. In this first state, the switch is in an "off" state.

In the first state (FIGS. 9A-9C) the grip member 4 and the operator body member 8 are arranged with respect to each other such that the cams 34 of the grip member 2 are received in the first grooves 48 of the operator body member 8. The compression spring 12 urges the grip member 4 away from the spindle member 6 and thus from the operator body member 8 so that the cams 34 are urged against the stops 52 and are securely held within the first grooves 48 (cf. FIG. 8I).

Thus, in the first state the grip member 4 is arranged in a first translational position, here axial position Z1, and a first rotational position φ1 with respect to the operator body member 8 (and thus with respect to the switch 2), here being substantially 0°. Interference between the cams 34 and the first grooves 48 in the rotational or tangential direction (φ-direction) with respect to the axis A substantially blocks rotation of the grip member 4 with respect to the operator body member 8. Consequently, in the first state the assembly 1 and the switch 2 are protected against inadvertent rotation of the grip member 4.

However, the grip member 4 is free to be displaced by translation away from contact of the cams 34 with the stops 52 against the force of the spring 12 in a direction defined by the cams 34 cooperating with the first grooves 48 (here substantially along the axis A) towards another translational position (cf. FIGS. 8I to 8H).

In the second state (FIGS. 10A-10C) the grip member 4 is translated, compared to the first state, along the axis A to a second translational position Z2 which is closer to the switch 2. However, the grip member 2 is still in the first rotational position $\phi1$ of about 0° rotation. In this second state, each cam 38 is positioned outside the first groove 48 and is received in the volume 80. The arrangement and shape (here thickness in a direction substantially parallel to the axis A) of the volume 80 and the cams 34 is chosen so that the cams 40 may fit within the volume 80, and are prevented from leaving the volume 80 other than via the first grooves 48, corresponding to a translation of the grip member 4 with respect to the operator body member 8. In this second state the grip member 4 is free to rotate with respect to the operator body member 8. Rotating the grip member 4 causes a corresponding rotation of the spindle member 6 and thus of an associated spindle 14.

Thus, in the second state the grip member 2 is arranged in a second translational position, here axial position Z2, and in the first rotational position $\phi1$ with respect to the operator body member 8 (and thus with respect to the switch 2).

From the second state the switch 2 may be rotationally operated by rotation of the grip member 4 towards a different rotational position.

In the third state (FIGS. 11A-11C) the grip member 2 is rotated about the axis A, compared to the second state, to a second angular position $\phi2$, guided by the cams 34 being received in the volume 80 (cf. FIGS. 8H, 8G, 8F). The cams 34 interfere with the portions defining the volume 80 which prevent the grip member 4 from returning from the second translational position Z2 to the first translational position Z1. The volume 80 may comprise stops interfering with the cams 34 and preventing rotation of the grip portion 4 with respect to the operator body member 8 beyond the second angular position $\phi2$.

Thus, in the shown embodiment, the grip member 4 is prevented from translation in a direction substantially parallel to the axis A in the third state by interference of the cams 38 and portions of the assembly defining the volume 80. However, in another assembly 1 such translation may be allowed into a further state of the assembly in which the grip member 4 is in a first translational position, e.g. axial position Z1, and in the second rotational position $\phi2$ with respect to the operator body member 8 (and thus with respect to the switch 2), such that inadvertent rotation of the grip member 4 away from the second rotational position $\phi2$ may be substantially prevented.

Switching the operator assembly 1 and the switch 2 from the third state to the first state is effected by inverting actions; rotate from $\phi2$ to $\phi1$ at translational position Z2 defined by interaction of the cams 34 and the volume 80, then translate (assisted by the spring 12) from Z2 to Z1 at angular position $\phi1$ defined by interaction of the cams 34 and the grooves 48.

Figure 10A:
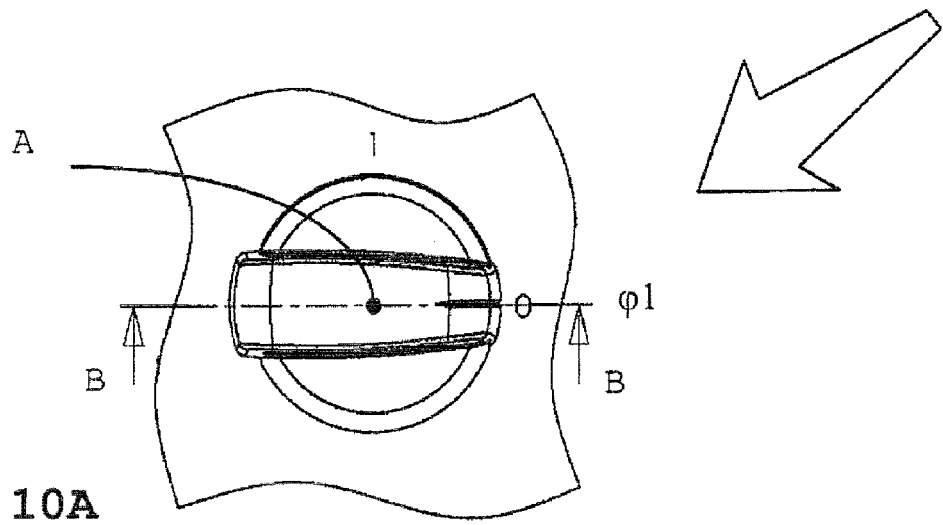
FIGS. 10A-10C are various views of a rotary operator assembly in a second state.
Figure 10B:
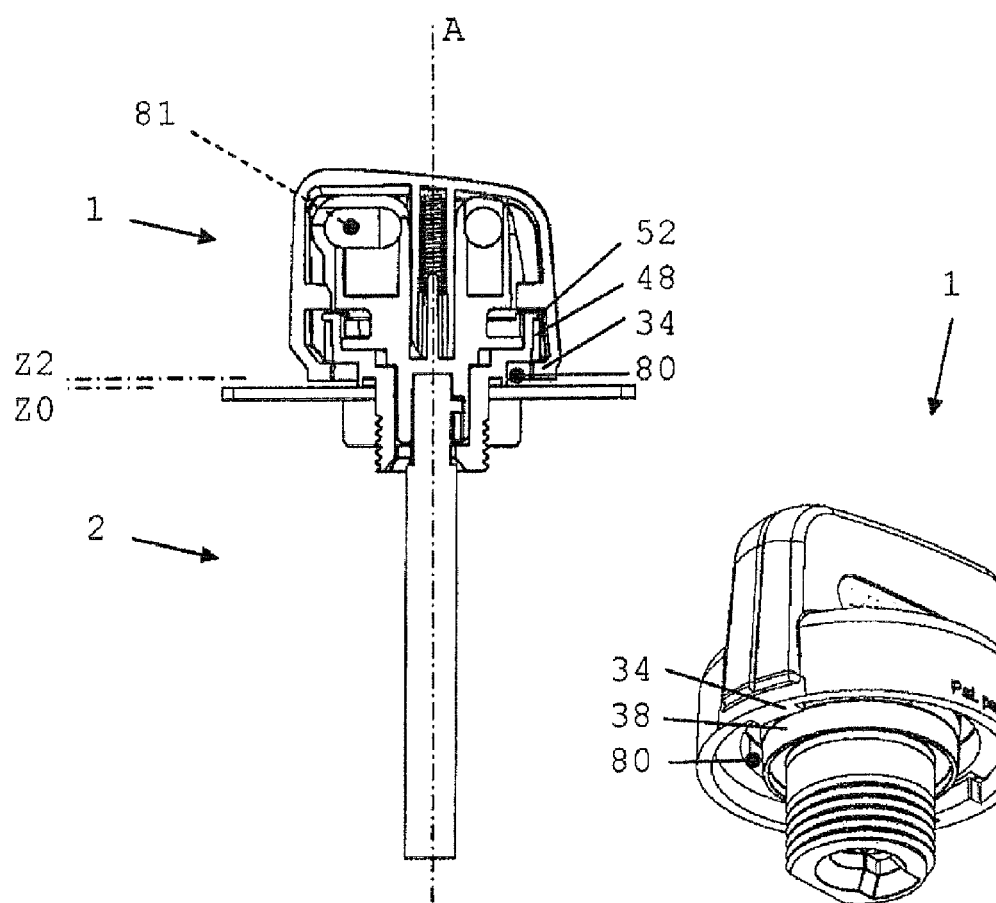
Figure 10C:
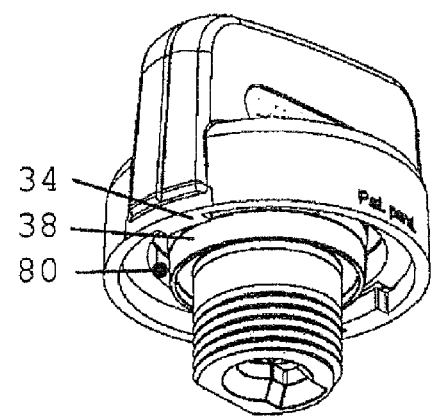

From the above, and in particular from comparing FIGS. 9A-9C with FIGS. 10A-10C, it may be seen that in the first translational position Z1 the through hole 36 in the grip member 4 and the through hole 72 in the spindle member 6(A) register to cooperate and form a substantially continuous through hole 81 through the assembly 1 (FIG. 9B). In the second translational position Z2 the wing 68 is aligned with the through hole 36 in the grip member 6 and the through hole 81 is blocked (indicated with a broken line in FIG. 10B).

Thus, in the first translational position Z1, in particular in the first state, a shackle of a padlocking device or another locking device may be arranged through the continuous through hole 81 to prevent translation of the grip member 6 between the first translational position Z1 and the second translational position Z2 in the first angular position $\phi1$. Since such translation is prevented, rotation from the first state to the third state, or from the first angular position $\phi1$ to the second angular position $\phi2$ is also prevented. Thus, operation of the switch 2 is prevented. The continuous through hole 81 may be arranged to accommodate more than one locking device. A through hole similar to the hole 81 may be provided with the through hole 74 in the spindle member 6(A) and a cooperating through hole in the grip member 4.

The above described operation and the possibility of blocking thereof due to cooperating through holes is substantially identical for the embodiments of FIGS. 1A-1B and FIG. 2.

Instead of cooperating holes 72 and windows 35 other locking means may be provided, e.g. a lock bolt and a corresponding aperture or recess, which means may be integrated in at least one of the grip member and the spindle member.

In case the switch 2 had been switched by the operator assembly 1A to the third state, at translational position Z2 and rotational position $\phi2$, switching off the switch 2 to the first state may be attempted although the switch is obstructed, such as by electrical contacts having become welded together during use. In that case, a user may experience difficulty rotating the grip member. However, if the user overcomes this difficulty returning the assembly 1 to the first state with the grip member 4 in the first translational position Z1 and the first rotational position $\phi1$ may be inadvertently possible. Thus, the assembly could be locked in the first state by the locking means and an inaccurate and potentially dangerous notion of safety would be provided whereas the device is still active.

However, if the spindle 12 is effectively jammed and not free to rotate back from the second angular position $\phi2$ to the first angular position $\phi1$ the same holds for the spindle member 6A. Thus, when forcibly rotating the grip member 4 from $\phi2$ to $\phi1$ against an obstructed spindle member 6A a torsion force Ft arises between the spindle member 6A and the grip member 4.

Figure 12A:
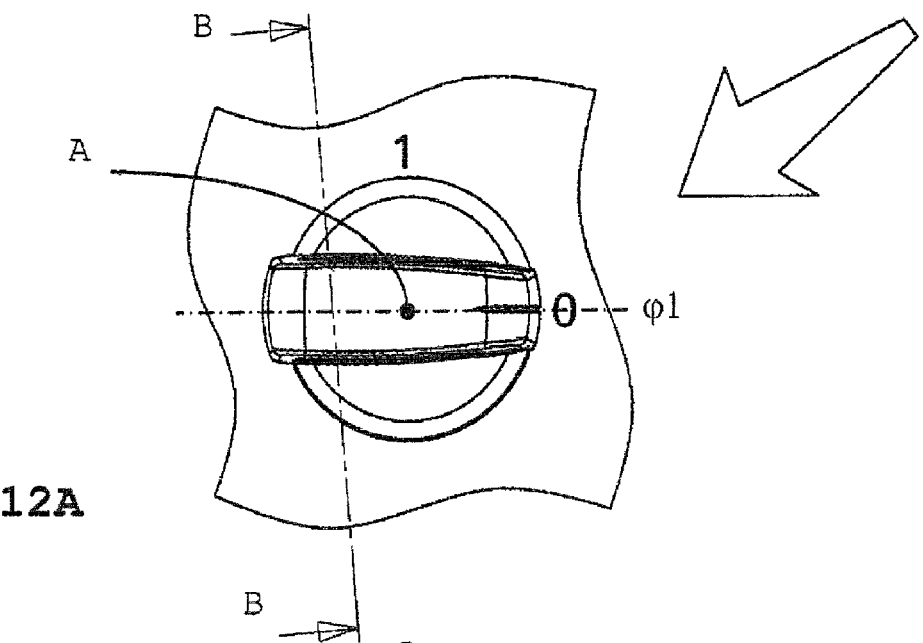
FIGS. 12A-12D are various views of a rotary operator assembly in a fourth state, FIG. 12D being a cross-sectional view along the plane DD indicated in FIG. 12B.
Figure 12B:
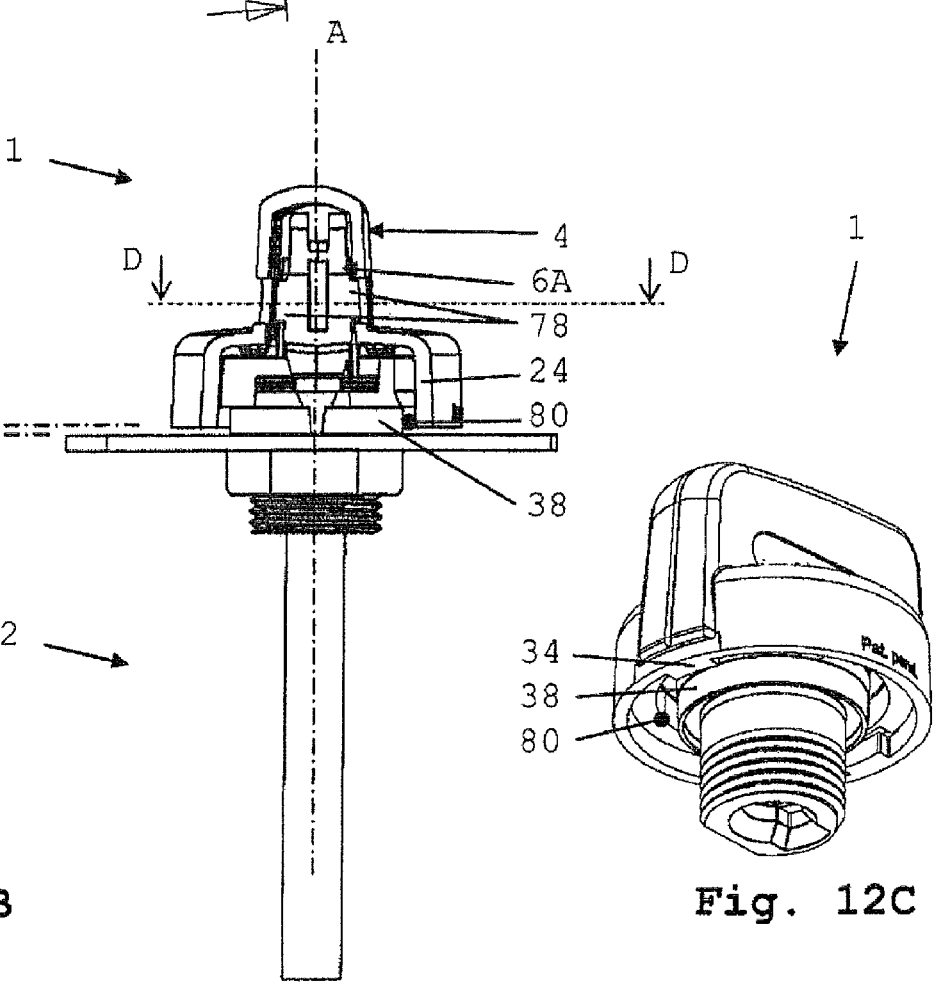
Figure 12C:
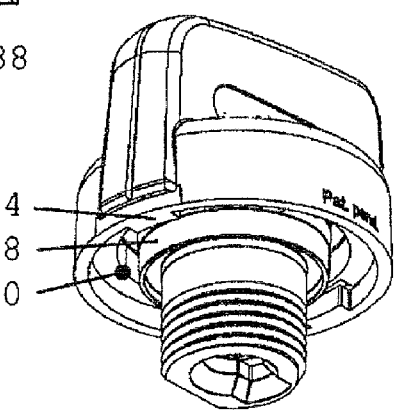
Figure 12D:
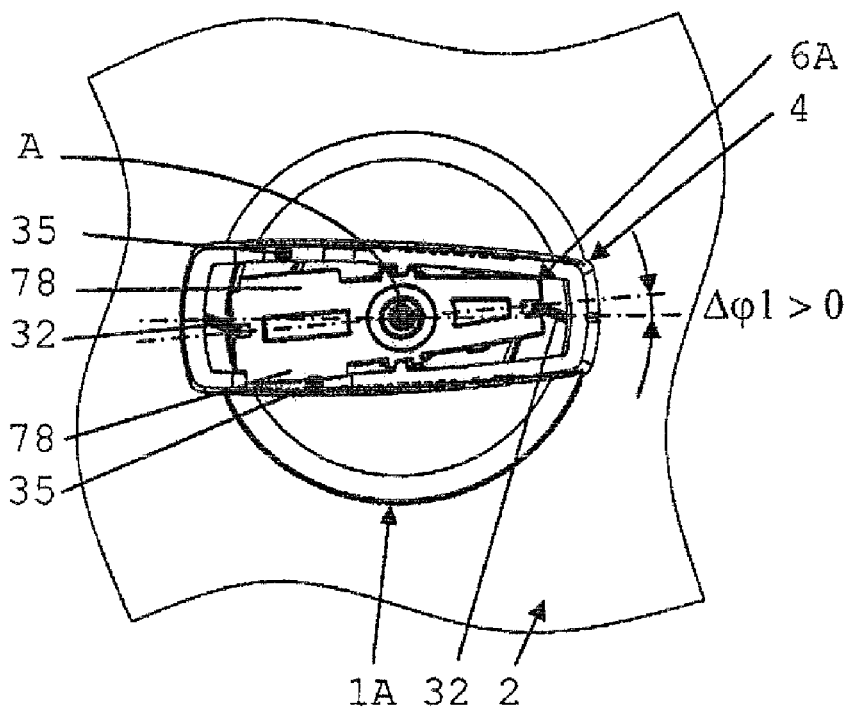
Figure 13:
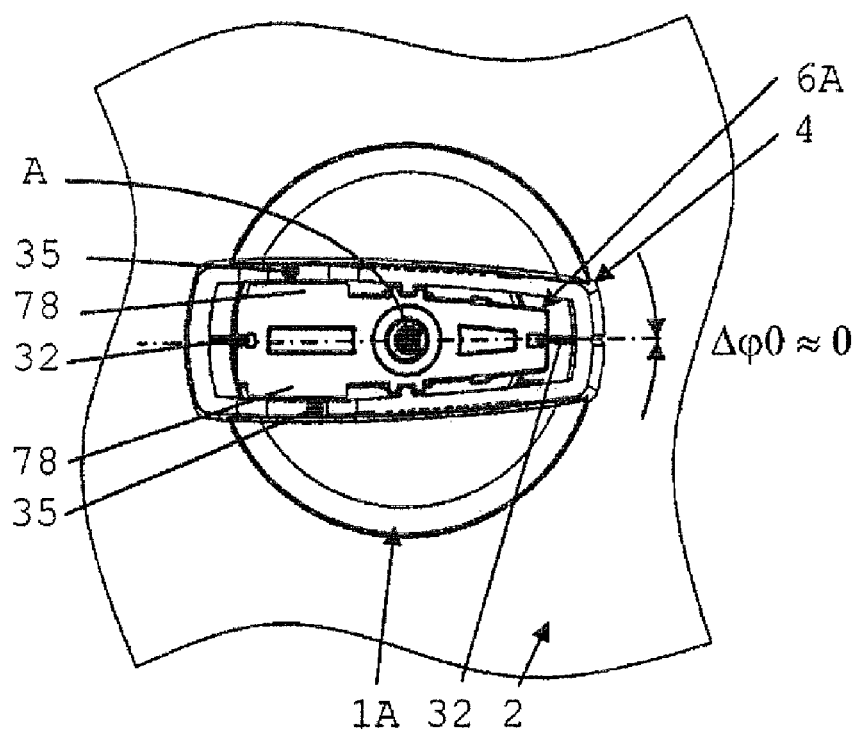
FIG. 13 shows s view similar to FIG. 12D of a rotary operator assembly in the second state.

In the embodiment of assembly 1A such torsion force Ft, when it is larger than a restoring force Fr provided by the resilient portions 32 of the grip member 4 acting on the grooves 76 of the spindle member 6A forces a relative non-zero angular position $\Delta\phi1$ between the spindle member 6A and the grip member 4, see FIG. 12D, as compared to a first relative angular position $\Delta\phi0$ in the normal case of free rotation, preferably about 0° (e.g. see FIG. 13). In such case of a relative non-zero angular position $\Delta\phi1$ a cam 78 penetrates into a window 35 of the grip member 4, as best seen in FIGS. 12B and 12D. Such interpenetration blocks translation of the grip member 4 with respect to the spindle member 6A and thus with respect to the operator body member 8 from the second translational position Z2 to the first translational position Z1. Thus, as long as the blocking torsion force Ft is not lifted, returning the assembly from the second state (Z2, $\phi1$) to the first state (Z1, $\phi1$) is prevented, such that locking the assembly in the first state and consequent false security is prevented.

The torsion force Ft may be sufficiently strong that upon letting the grip member 4 go the assembly may return to the third state (Z2, $\phi2$).

In the shown embodiment cams 78 and windows 35 are arranged on both sides of the spindle member 6 and the grip member 4, providing an assembly 1A protecting against torsion forces in two directions (clockwise and counter clockwise as shown here).

It should be noted that the resilient force Fr of the resilient portions 32 may be configured to provide a default relative angular position Δϕ0 and to overcome unimportant regular rotational friction force in the assembly 1A and/or a device comprising the assembly, improving reliability in regular use, but to provide a security cut-off force value which may be overcome by a torsion force Ft of a predetermined value e.g. corresponding to a dangerous situation.

Figure 14:
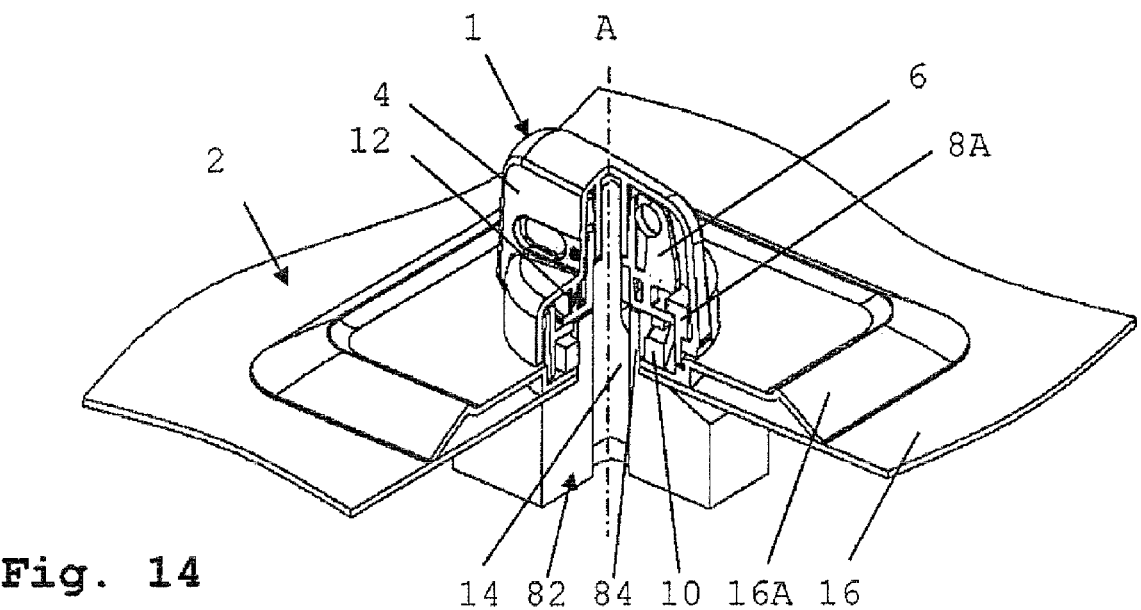
FIG. 14 shows an alternative embodiment of a rotary operator assembly.

FIG. 14 is a perspective view, partially cut-away to the axis A, of another embodiment of a rotary operator assembly 1 and a rotary operable switch 2. FIG. 14 shows a rotary operator assembly 1 comprising a grip member 4, a spindle member 6A and an operator body member 8A substantially as before. Two compression springs 12 are arranged on opposite sides between the spindle member 6(A) and the grip portion 4, fitting the pegs 30 (see FIGS. 3B, 3C).

The switch 2 comprises a switch body 82 comprising a rotary spindle 14, and a housing 16 with a housing plate 16A, e.g. for carrying markings. In this embodiment the device body 82 comprises a non-round mounting portion 84 configured to penetrate the housing 16 and the housing plate 16A through a non-round hole 18, so as to be fixed thereto non-rotatably with the mounting nut 10.

Figure 15:
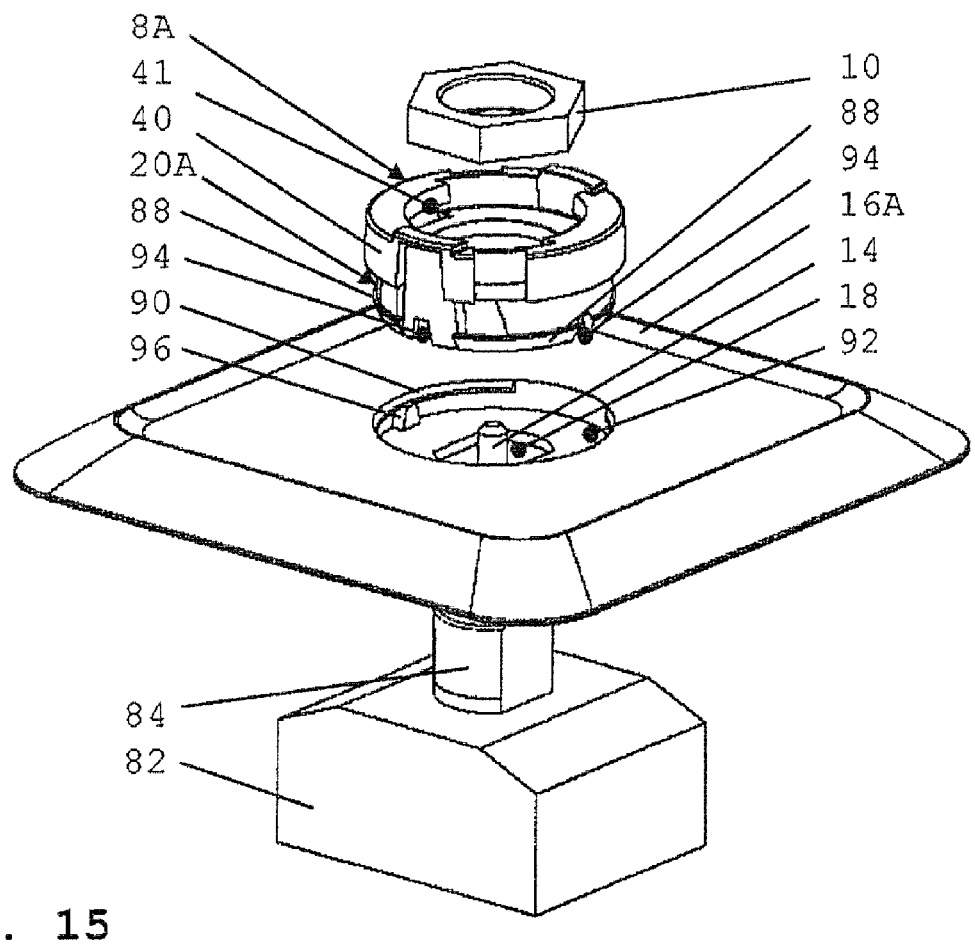
FIG. 15 is partial explosion view of the embodiment of FIG. 14.

FIG. 15 is a partial explosion view of the assembly 1 of FIG. 14, showing only the mounting nut 10, the operator body member 8A, the housing plate 16A and the switch body 82.

In the embodiment of FIGS. 14, 15, the operator body member 8A does not comprise a mounting portion 20 with an exterior screw thread for cooperating with the nut 10. Instead, the operator body member 8a is configured to accommodate the mounting portion 84 of the switch body 82 and the mounting nut 10 in its interior cavity 41.

The operator body member 8A comprises a first portion or mounting portion 86 and a second portion 40, substantially identical to the portion 40 of the previously described embodiments. The first portion 86 comprises latches 88 and is configured to be snap-locked to corresponding latches 90 in a cavity 92 in the second housing plate 16A. Recesses 94 in the operator body member 8A and corresponding protrusions 96 in the cavity 92 prevent rotation of the operator body member 8A with respect to the housing plate 16A.

The disclosure is not restricted to the above described embodiments which can be varied in a number of ways within the scope of the claims. For instance, the cams 78 may be provided with a signal colour to provide additional visual indication of an unallowably high torsion force indicating failure.

The cams 78 and/or the grip member 4 may be shaped with one or more dedicated weak portions so as to provide clear signal of torsional failure, e.g. a ribbon seal which is broken at a relative non-zero angular displacement of Δϕ1 or of another relative angular position Δϕ2.

Instead of resilient portions 32 which may be integrated with the grip member 4, springs or separate resilient objects such as one or more rubber pads may be used.

It should be noted that the blocking operation(s) of the assemblies 1, and 1A also work to prevent translation in a direction perpendicular to the axis of rotation A of a grip member with respect to a spindle member, not just in a direction substantially along or parallel to the axis A. The shape of the cams 78 and/or the relative angular displacement desired or required for effective blocking may be adapted to various circumstances. The cams 78 may also be provided with a locking means, e.g. a hole for allowing a shackle of a padlocking device, so that the torsional state may be maintained for fault-inspection. However, this may be an unallowably dangerous option in some cases.

The operator body member may be an integral whole with (a portion of) a rotary operable device.

The rotary operable device need not comprise a spindle: (the spindle portion of) the operator assembly may be configured to operate a substantially linear-moving object e.g. a switch.

Instead of cams 78 cooperating with windows 35 which also form a continuous through hole 81 cooperating with through holes 72 in the spindle member 6, one or more dedicated portions may be provided in the grip member 4 for receiving the cams 78. Also, the grip member 4 may comprise one or more protrusions and the spindle member may comprise one or more portions to receive said one or more protrusions.

Elements and aspects discussed for or in relation with a particular embodiment may be suitably combined with elements and aspects of other embodiments, unless explicitly stated otherwise.

What is claimed is:

1. A rotary operator assembly comprising:
a grip member, a spindle member, and an operator body member,
the spindle member is attached to the operator body member and is rotatable with respect to the operator body member about an operative axis of rotation,
the grip member is movably coupled to the spindle member and the operator body member and is translatable between a first translational position and a second translational position with respect to the operator body member,
the grip member and the operator body member comprise cooperating elements for blocking rotation of the grip member with respect to the operator body member about the operative axis of rotation in the first translational position and for allowing rotation of the grip member with respect to the operator body member about the operative axis of rotation in the second translational position from a first angular position to a second angular position,
wherein the grip member is movable with respect to the spindle member, the grip member being configured to operably couple with the spindle member in at least the second translational position,
wherein the grip member comprises at least one portion cooperating with at least one portion of the spindle member for preventing translation of the grip member between the first translational position and the second translational position in the first angular position,
the grip member and the spindle member comprising cooperating elements for allowing translation of the grip member with respect to the operator body member between the first translational position and the second translational position in a first relative angular position of the spindle member with respect to the grip member, and
the cooperating elements for blocking translation of the grip member between the first translational position and the second translational position in a second relative angular position of the spindle member with respect to the grip member different from the first relative angular position.

2. The rotary operator assembly according to claim 1, wherein the first translational position and the second translational position of the grip member with respect to the operator body member are separated by a translation in a direction substantially parallel to the operative axis of rotation of the spindle member.

3. The rotary operator assembly according to claim 1, wherein the grip member comprises at least one portion cooperating with at least one portion of the spindle member for locking the grip member to the spindle member in the first translational position.

4. The rotary operator assembly according to claim 3, wherein the at least one portion of the grip member and the at least one portion of the spindle member comprise through holes which are in matching registry in the first translational position.

5. The rotary operator assembly according to claim 4 and any one of the claims dependent thereof, wherein the assembly comprises a biasing member for urging the grip member and the spindle member to a substantially zero relative angular position.

6. The rotary operator assembly according to claim 4, wherein the cooperating elements comprise at least a receiving portion in at least one of the spindle member and the grip member which is configured to receive at least one projecting portion of at least one of the grip member and the spindle member, respectively.

7. The rotary operator assembly according to claim 1, wherein the spindle member and the operator body member are configured such that the spindle member is rotatably attachable or rotatably attached to the operator body member in a third angular position which is different from the first angular position and the second angular position.

8. The rotary operator assembly according to claim 1, wherein the grip member and the operator body member are configured such that the grip member is attached or attachable to the operator body member in a fourth angular position which is different from the first angular position and the second angular position.

9. The rotary operator assembly according to claim 1, wherein the grip member is attachable or attached by snap-fitting to the operator body member by cooperating cams and latches arranged in a rotationally asymmetric pattern with respect to the operative axis of rotation.

10. The rotary operator assembly according to claim 1, wherein the assembly comprises a biasing member for urging the grip member to a default position with respect to the operator body member.

11. The rotary operator assembly of claim 10 wherein the default position is the first translational position.

12. The rotary operable device comprising a rotary operator assembly according to claim 1.

13. The rotary operable device according to claim 12, wherein the device is an electrical switch comprising at least a first and a second electrical contact and at least one further electrical contact, the further contact being couplable with the spindle member and being configured to establish electrical contact between the first and second electrical contacts in at least one predetermined angular position of the spindle member.

14. A kit comprising at least one of a grip member and a spindle member or a spindle member and an operator body member configured for assembling a rotary operator assembly according to claim 1.

15. A method of assembling a rotary operator assembly according to claim 1, the method comprising:
    providing an operator body member, a grip member and a spindle member as defined in claim 1;
    attaching the spindle member to the operator body member in a third angular position with respect to the operator body member, different from the first angular position and the second angular position as defined in claim 1;
    arranging the spindle member with respect to the operator body member to the first angular position;
    attaching the grip member to the operator body member.

16. The method of assembling a rotary operator assembly according to claim 1, the method comprising:
    providing an operator body member, a grip member and a spindle member as defined in claim 1;
    attaching the grip member to the operator body member in the second translational position and a fourth angular position with respect to the operator body member, different from the first angular position and the second angular position as defined in claim 1;
    arranging the grip member with respect to the operator body member to the first angular position;
    arranging the grip member with respect to the operator body member to the first translational position.

* * * * *